UNITED STATES PATENT OFFICE.

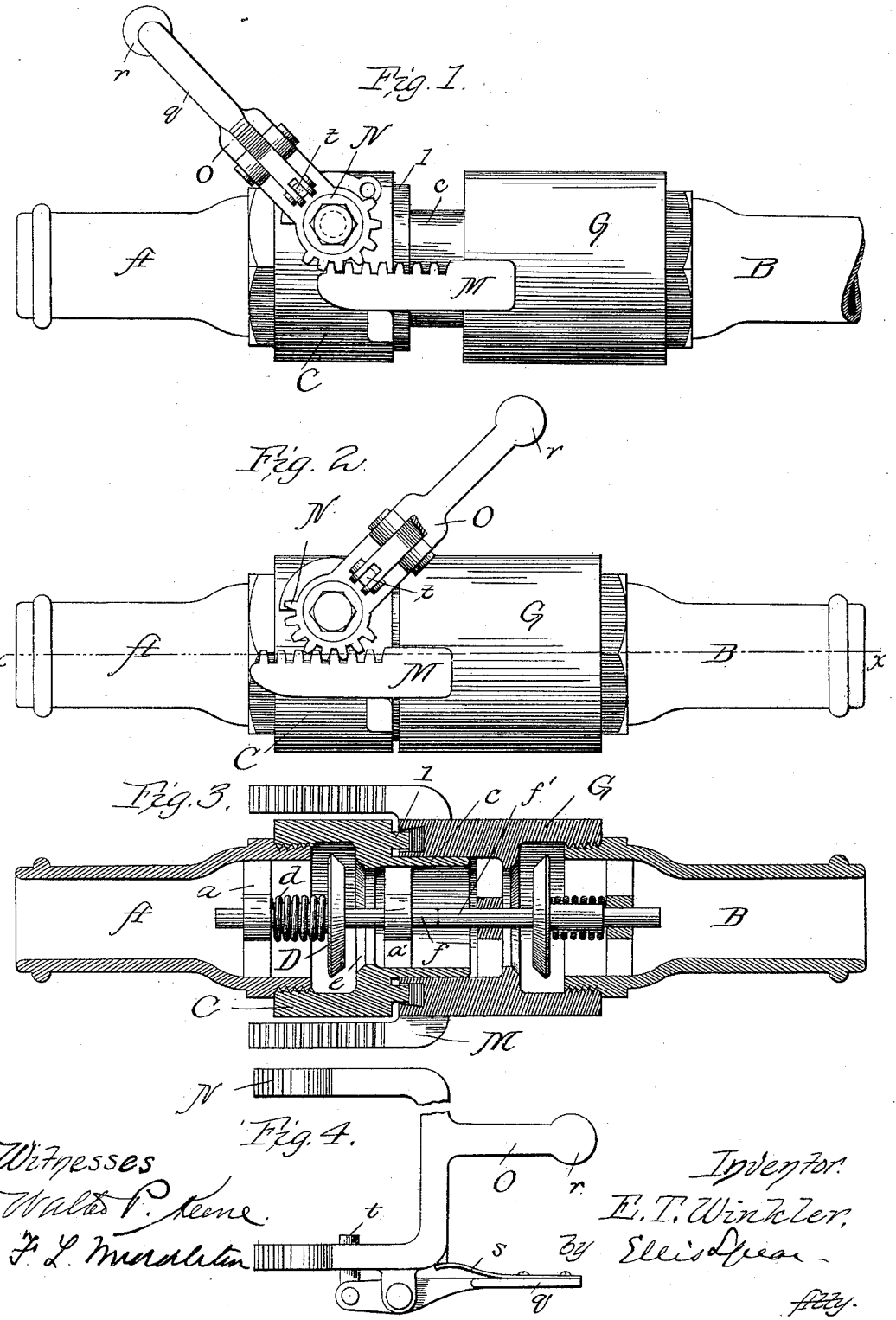

EHREGOTT THEODORE WINKLER, OF PHILADELPHIA, PENNSYLVANIA.

HOSE-COUPLING.

SPECIFICATION forming part of Letters Patent No. 430,721, dated June 24, 1890.

Application filed October 15, 1889. Serial No. 327,074. (No model.)

*To all whom it may concern:*

Be it known that I, EHREGOTT THEODORE WINKLER, of Philadelphia, in the county of Philadelphia and State of Pennsylvania, have invented a new and useful Improvement in Hose-Couplings; and I do hereby declare that the following is a full, clear, and exact description of the same.

My invention relates to couplings for air, steam, and water pipes, and is specially designed to couple the pipes of a train of cars, but is not limited necessarily to such use.

The special construction which constitutes my invention is set forth hereinafter in connection with the objects and results of the construction, and it is illustrated in the accompanying drawings, in which—

Figure 1 represents the coupling in side elevation and not fully closed. Fig. 2 is a similar view with the coupling closed. Fig. 3 represents a horizontal section of the coupling in closed position and on line $x\ x$ of Fig. 2. Fig. 4 shows a plan view of the operating and locking lever.

In the drawings, A and B are the parts of the coupling, each being provided with a shank for connecting it with the hose. Each part, as shown, is made in two pieces for convenience of manufacture.

Referring first to the part A, it will be observed that it is composed of a cylindrical body C, the front end $c$ of which is reduced and is in the form of a tubular extension. The forward end of the tubular extension $c$ is rounded and fitted to enter readily a corresponding recess in the opposite part of the coupling, as hereinafter described. The cylinder, back of the tubular extension, is formed with a shoulder in a plane at right angles to the axis of said extension. On the face of it is an annular flange 1 or rib fitted to enter an annular recess in the opposite face of the other part of the coupling. The shank is reduced and threaded on its forward end to fit the rear internally-threaded end of the cylindrical part $c$. This has also a diaphragm or cross-bar $a$ bored on an axial line to receive and support the valve-stem of the valve D. A spring $d$ on the stem tends to keep the valve closed on its seat $e$. A supplemental stem $f$ projects axially forward from the face of the valve through the cross-bar $a'$ into the cylindrical extension $c$, and when the coupling is open and the valve is off its seat the supplemental stem is forward and at or near the end of the extension.

The other part of the coupling B is made also of two sections, a cylindrical part (marked G) and a shank the same as that described above. The cylindrical part has a valve-seat, and there is also a valve having its stem supported on a cross-bar or diaphragm, as heretofore described, and has a spring on the stem arranged to force the valve to its seat. This valve has also a supplemental stem $f''$ axially arranged and projecting forward in line with the stem $f$, and to such a distance that about the time the tubular extension of the part of the coupling first described enters the other part the ends of the stems come into contact, and as the parts close together they press the valves from their seats and leave an open passage for the unobstructed flow of the fluid in the pipe or hose.

It will be observed that the extension which enters the part B is in advance of the annular rib on the shoulder outside of the extension. The space between the two parts is therefore closed, and the two parts united to form a tubular passage first by the tubular extension. This fits closely enough in the cavity to prevent any material escape and loss of the contents until the closing of the coupling is completely effected. When this is effected, the annular rib enters the opposing groove and presses against the packing therein, forming a perfect joint and effectually preventing the escape of the contents of the pipe.

In order to draw the parts strongly into contact, an arm M, formed as a rack on its upper edge, is fixed on each side of the part B, and arranged to extend, when the parts are in their first contact, alongside the part A and underneath and in engagement with the teeth of a segmental semicircular rack N. These racks N are pivoted centrally on the part A, and are formed on the sides of a frame O, by means of which they are rocked. The frame has a handle for this purpose, and this should be in the position shown in Fig. 1 when the parts are first brought into contact. Then the rack-bar arm comes into contact with the gear on each side, and the frame is tilted to the position shown in Fig. 2. This causes the racks to draw on the bars and force the parts firmly together. When in this position, a spring-bolt $t$ snaps into a hole and secures the parts. In releasing this it is necessary only to force out the lever $q$ of the snap-bolt by pressing it toward the handle $r$. A spring $s$ holds the snap-bolt in place. When this is released, the springs on the valve-stems force the parts asunder.

I claim—

1. In combination with the two parts of a coupling, the racks M, secured to one part and extending beyond the end thereof, parallel to each other, the pivoted frame mounted upon the other part, and segmental racks on the ends of said frame, substantially as described.

2. In combination with a two-part coupling, parallel racks carried by one part, semicircular racks meshing therewith, carried by the other part, a frame terminating in a handle for operating the semicircular racks, and a spring-bolt for locking the parts in place, substantially as described.

In testimony whereof I have signed my name to this specification in the presence of two subscribing witnesses.

EHREGOTT THEODORE WINKLER.

Witnesses:
F. M. GARDNER,
OTTO ERNST.